US012621152B2

(12) United States Patent
Sutton-Shearer et al.

(10) Patent No.: US 12,621,152 B2
(45) Date of Patent: May 5, 2026

(54) TOKENIZATION OF DIGITAL MEDIA FILES AND ASSOCIATED DERIVATIVES

(71) Applicants: Drake Sutton-Shearer, Los Angeles, CA (US); James G. Gatto, Vienna, VA (US)

(72) Inventors: Drake Sutton-Shearer, Los Angeles, CA (US); James G. Gatto, Vienna, VA (US)

( * ) Notice: Subject to any disclaimer, the term of this patent is extended or adjusted under 35 U.S.C. 154(b) by 237 days.

(21) Appl. No.: 17/657,744

(22) Filed: Apr. 1, 2022

(65) Prior Publication Data

US 2023/0053969 A1     Feb. 23, 2023

Related U.S. Application Data

(60) Provisional application No. 63/169,506, filed on Apr. 1, 2021.

(51) Int. Cl.
| | |
|---|---|
| *H04L 9/32* | (2006.01) |
| *G06Q 20/36* | (2012.01) |

(52) U.S. Cl.
CPC ........... *H04L 9/3213* (2013.01); *G06Q 20/36* (2013.01)

(58) Field of Classification Search
CPC ..... H04L 9/3213; H04L 2209/56; H04L 9/50; G06Q 20/36; G06Q 20/065; G06Q 20/1235; G06Q 20/363; G06Q 20/3672; G06Q 20/405; G06F 21/1014; G06F 21/64
See application file for complete search history.

(56) References Cited

U.S. PATENT DOCUMENTS

| | | | |
|---|---|---|---|
| 2009/0198617 A1* | 8/2009 | Soghoian | ............... G06Q 20/04 |
| | | | 705/65 |
| 2017/0214522 A1* | 7/2017 | Code | ........................ G06F 21/64 |
| 2023/0075884 A1* | 3/2023 | Jakobsson | ................. H04L 9/50 |

FOREIGN PATENT DOCUMENTS

WO     WO-2022183070 A1 *     9/2022     ......... G06F 21/1014

* cited by examiner

*Primary Examiner* — Sm A Rahman
(74) *Attorney, Agent, or Firm* — Duncan Galloway Greenwald PLLC; Kevin T. Duncan

(57) ABSTRACT

Managing digital media files in a computer network by storing a set of derivative files and a logical association of the derivative files with the first digital media file; generating a first cryptographic token; associating the first cryptographic token with the first digital media file; associating the first cryptographic token with a first wallet address corresponding to a first wallet; generating a serialized set of non-fungible tokens and associating individual ones of the non-fungible tokens with individual ones of the derivative files; and associating individual ones of the non-fungible tokens with individual wallet addresses of a second set of wallets; and limiting the initial transferability of the first cryptographic token from the first wallet to one of the second set of wallets.

22 Claims, 3 Drawing Sheets

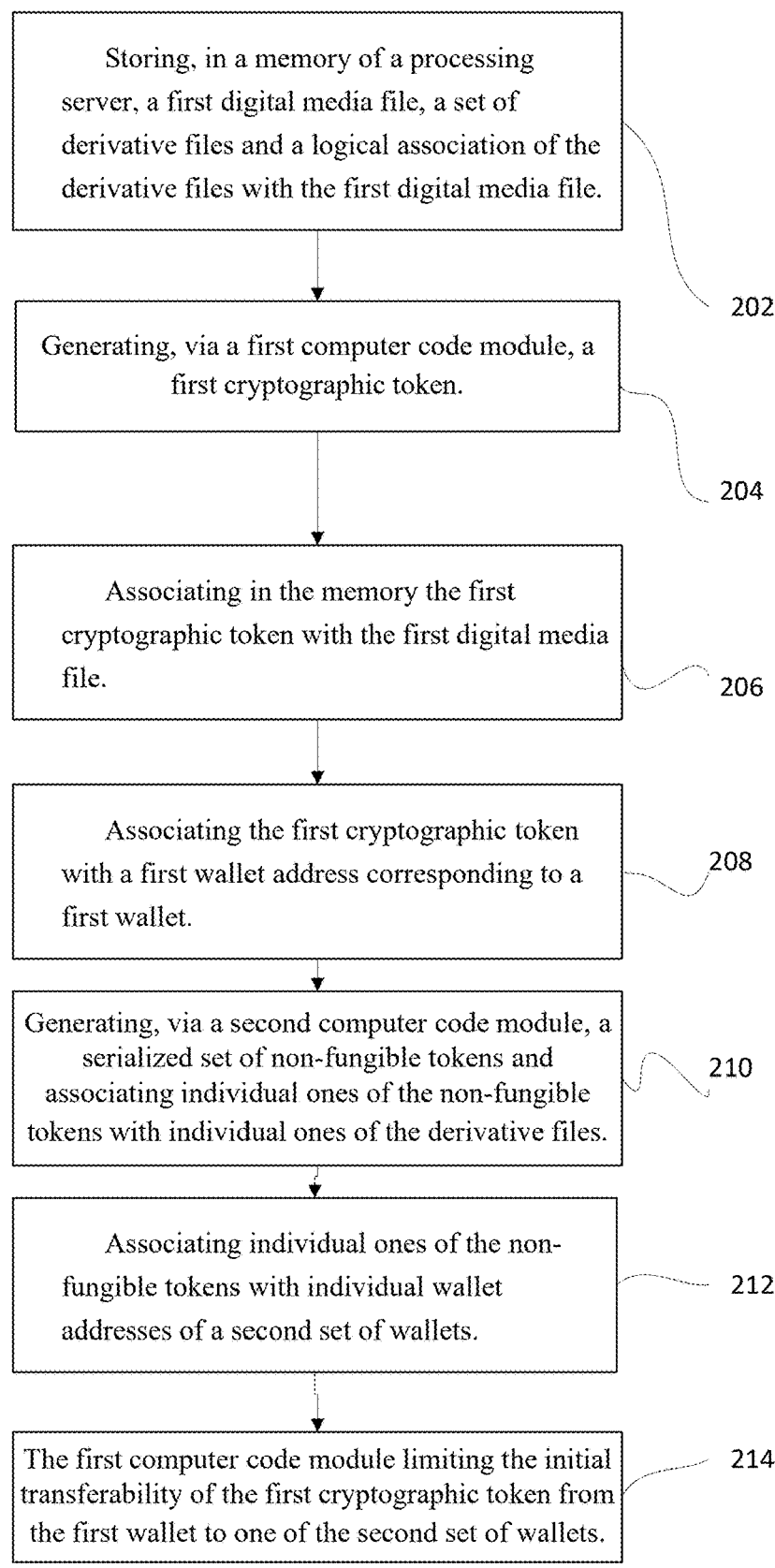

Storing, in a memory of a processing server, a first digital media file, a set of derivative files and a logical association of the derivative files with the first digital media file.

202

Generating, via a first computer code module, a first cryptographic token.

204

Associating in the memory the first cryptographic token with the first digital media file.

206

Associating the first cryptographic token with a first wallet address corresponding to a first wallet.

208

Generating, via a second computer code module, a serialized set of non-fungible tokens and associating individual ones of the non-fungible tokens with individual ones of the derivative files.

210

Associating individual ones of the non-fungible tokens with individual wallet addresses of a second set of wallets.

212

The first computer code module limiting the initial transferability of the first cryptographic token from the first wallet to one of the second set of wallets.

TOKENIZATION OF DIGITAL MEDIA FILES AND ASSOCIATED DERIVATIVES

CROSS-REFERENCE TO RELATED APPLICATION AND INCORPORATION BY REFERENCE

The present invention claims the benefit of priority to U.S. Prov. Pat. App. No. 63/169,506 filed Apr. 1, 2021 (0100-923228-DRAKE), entitled TOKENIZATION OF DIGITAL MEDIA FILES AND ASSOCIATED DERIVATIVES (Sutton-Shearer), which is incorporated by reference herein in its entirety.

FIELD OF THE INVENTION

The present invention and subject disclosure herein relates to digital media file management via a system and process for tokenization of digital media files and associated derivatives of the digital media files within a blockchain network or distributed ledger technology (DLT) system (collectively referred to as a "digital registry").

BACKGROUND

System and processes for tokenization of digital media in general is known. See for example U.S. Pat. No. 10,915,874 "System And Process For Tokenization Of Digital Media," which is incorporated herein by reference in its entirety. The technology disclosed in the '874 patent fails to provide a technical solution that address the scenario where an original digital media file is tokenized and a serialized set of derivative files of the original are created and tokenized via a set of non-fungible tokens.

SUMMARY OF THE INVENTION

The invention relates to a computer network (e.g., blockchain (or other DLT)-based platform) for digital media file management, including controlling the transfer of a first cryptographic token associated with a first digital media file under control of a first computer code module (e.g., a first smart contract), including electronically storing in a data structure in the network an association of the first digital media file with a set of associated files that comprise derivatives files of the first digital media file and associating individual ones of the derivative files with corresponding non-fungible cryptographic tokens (NFTs).

The system further includes additional computer code modules (e.g., smart contracts) configured to manage the assignment of the non-fungible cryptographic tokens to designated digital wallet addresses associated with corresponding owners of the non-fungible cryptographic tokens. Digital wallets, or e-wallets or cryptocurrency wallets, can be in the form of physical devices such as smart phones or other electronic devices executing an application or electronic services, online services, or software platforms. Digital wallets may provide a store of value or a credit or access to credit and may be in the form of a digital currency or involve a conversion to digital currency, tradeable digital asset, or other medium of exchange. For example, digital currency may be in the form of cryptocurrency/wallet platforms, e.g., Bitcoin, Ethereum, Dogecoin, Shiba Inu, Ripple, Harmony, Polkadot, and Litecoin. The stored value accessible using a digital wallet may involve authentication to access ownership records or other indica stored in a digital ledger or DLT and requiring authentication and/or other decryption techniques to access the store of value. Parties may use digital wallets in conducting electronic financial transactions including exchanges of digital currency for goods and/or services or other consideration or items of value. Transactions may involve use of merchant or other terminal equipment and involve near field communication (NFC) features or other communication techniques and use a computer network. In addition, digital wallets may include identifying or authenticating information such as account credentials, loyalty card/account data, and driver's license information, and the transaction may involve communicating information contained or stored in the digital wallet necessary to complete intended transactions.

Additionally, the first computer code module is configured to limit the transfer of the first cryptographic token to one of the designated wallet addresses of an owner of one of the non-fungible cryptographic tokens associated with the derivative files.

A first embodiment of the present invention provides a computer-implemented method for managing digital media files in a computer network comprises: storing, in a memory of a processing server, a first digital media file, a set of derivative files and a logical association of the derivative files with the first digital media file; generating, via a first computer code module, a first cryptographic token, associating in the memory the first cryptographic token with the first digital media file; associating the first cryptographic token with a first wallet address corresponding to a first wallet; generating, via a second computer code module, a serialized set of non-fungible tokens and associating individual ones of the non-fungible tokens with individual ones of the derivative files; and associating individual ones of the non-fungible tokens with individual wallet addresses of a second set of wallets; wherein the first computer code module is configured to limit the initial transferability of the first cryptographic token from the first wallet to one of the second set of wallets.

The method may further be characterized in one or more of the following manners: wherein the first digital media file comprises a digital art file, a digital music file, a digital book or a digital collectibles file; wherein the first digital media file is an original file and the set of derivative files comprise derivatives of the original file; wherein the first digital media file is an original an original version of a creative work; wherein the first digital media file is an original file and the derivative files comprise a limited edition set of copies, modifications or enhancements of the original file.

BRIEF DESCRIPTION OF THE DRAWINGS

To facilitate a full understanding of the present invention, reference is now made to the accompanying drawings, in which like elements are referenced with like numerals. These drawings should not be construed as limiting the present invention but are intended to be exemplary and for reference.

FIG. 2 provides a flow chart representing a method of implementing the present invention.

DETAILED DESCRIPTION OF THE INVENTION

The detailed description set forth herein is intended as a description of various configurations of the subject technology and is not intended to represent the only configurations in which the subject technology may be practiced. However, it will be apparent to those skilled in the art that the subject technology may be practiced without these specific details. Like or similar components are labeled with identical element numbers for ease of understanding.

Figure 1:
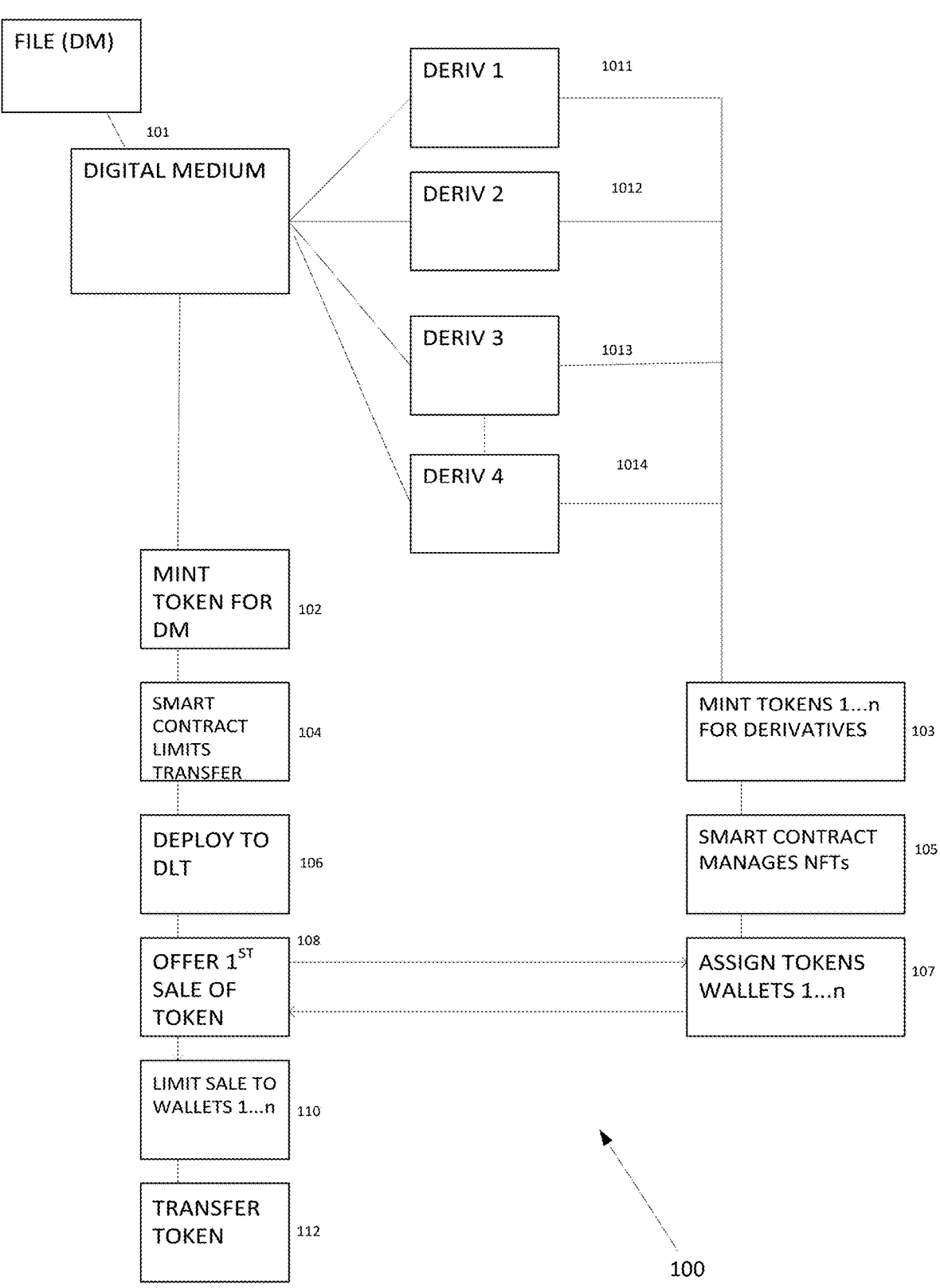
FIG. 1 provides a schematic diagram of an exemplary digital file management creation and storage system or construct in accordance with a first embodiment of the present invention.

With reference to FIG. 1, one example implementation of the invention as a digital media file construct or system 100 is shown having a first digital media file 101 (digital art, music, collectible or other type of digital media file) created and stored in the system. For convenience, the first digital media file may be referred to as an original file. A set (n) of derivative files (DERIV1-DERIV4 . . . DERIVn) (1011, 1012, 1013, 1014 . . . 101*n*) may be created, stored and logically associated with the original file 101 from which they are derived through the system storage. The association may be implemented via metadata in the original file referencing the derivative files, metadata in the derivative files referencing the original file, or both. Other association techniques may be used.

The derivative files may include a predetermined number (n) of derivatives of the original. For example, the original file may be an original version of a creative work. The derivative files may be a limited edition set of copies, modifications and/or enhancements of the original file.

The system 100 may create a first token representing ownership of the original (via an electronic registry) 102. The system may create a set of NFTs 103, each NFT representing ownership of one of the derivative files (via an electronic registry). The registry may associate the first token with a wallet address of the owner of the original file. The registry may assign or associate individual ones of the NFTs with a wallet address of the owner of an instance of the derivative file 102. The first computer code module (referred to as a first smart contract) 104 may be configured to limit transferability of the first token to an owner of the derivative files (e.g., one of the wallet addresses associated in the registry with the NFTs). The second computer code module (referred to as a second smart contract) 105 may be configured to manage aspects of the transfer of the NFTs and rights of the NFT owners to acquire the first token associated with the original file.

As one example, the derivative files may be part limited edition set of a derivatives of the original and the NFTs. According to one aspect of the invention, the NFTs representing ownership of the derivative files may be configured to give the NFT owners a right (or an exclusive right) to acquire the first token representing ownership of the original file.

The first computer code module 104 (first smart contract) may be configured to limit the transfer of the token representing the original file to one of the NFT token holders' wallet address. It may be deployed to a DLT 106.

In this way, the NFTs associated with the derivative files may be configured to represent not just ownership of the derivative file but also a right to participate in an offering to acquire ownership of the original file. Through the second computer code modules (e.g., a second smart contracts) 105 and/or the first computer code module 104, any offering of the transfer of the token associated with the first token 108 would be communicated to the NFT holders via an electronic message and in some cases, the first and/or second smart contracts would be configured to only permit the NFT token holders to participate in the process of the offering (sale, auction or other process) and limit the transfer of the first token to one of the NFT holders 110. Upon acquisition of the token associated with the original file, the token is transferred to the wallet of the acquirer 112.

Various types of NFTs and various blockchains, DLTs or other digital registry can be used. Preferably the digital registry is a decentralized registry. By way of example, the blockchain may be based on the Ethereum blockchain and the NFTs may be ERC-721 type tokens. ERC-721 is a standard interface for non-fungible tokens and is based on the fungible token standard ERC-20. Other formats may be used.

To the extent that the derivative files comprise a series of derivative files (e.g., having a predetermined number of files), each file can have a unique NFT associated therewith. Each token minted has a unique identifier. Ownership of an NFT can be recorded to the Ethereum blockchain. Ownership of an NFT can be based on association with a wallet address.

NFTs are programmable. ERC-721 provides a mapping of unique identifiers (each of which represents a single asset) to (wallet) addresses, which represent the owner of that identifier. ERC-721 also provides a permissioned way to transfer these assets, using the transferFrom method. For example, this may be represented as:

interface ERC721 {function
        ownerOf(uint256_tokenId) external view returns (address);
        function transferFrom (address_from, address_to, uint256_tokenId) external payable;

The computer code modules may comprise the type of computer code referred to as a smart contract on the Ethereum platform. In this example an ERC271 token is a smart contract on Ethereum designed for use as an NFT. A "smart contract" is a computer program that is stored on a blockchain that runs when predetermined conditions are met-such as a smart contract that runs on the Ethereum blockchain. A smart contract is a collection of code (its functions) and data (its state) that resides at a specific address on the blockchain, e.g., Ethereum blockchain. Smart contracts, once deployed, are not controlled by a user. Instead they are deployed to the blockchain network, e.g., Ethereum network, and run as programmed. User accounts can then interact with a smart contract by submitting transactions that execute a function defined on the smart contract. Smart contracts can be programmed to define rules and automatically enforce them via the code. In one manner smart contracts automate workflows by triggering actions when one or a set of conditions is met.

According to some aspects of the invention, the initial transfer from the owner of the token for the original work may be limited to a wallet address of one of the token owners of the derivative files associated with the original, but freely transferrable thereafter. The standard transferFrom method can be modified to include logic that implements the following:

If first transfer of token (for original file), get set of wallet addresses of NFTs for derivative files;
        Message wallets to notify of intent to transfer
        Permit offer messages only from wallet addresses of NFTs for derivative files
        Transfer to accepted offer (could be first to offer fixed price, auction or other sale)
        Transfer token to winning wallet address.

If token for original is resold, ignore the modified logic and transfer in accordance with standard transferFrom method.

In an exemplary embodiment, a digital media file is associated with a digital token. The digital token may be a string of bytes that define a set of rules or instructions associated with the base media file. The tokenized media file may be cryptographically secured to facilitate exchange between two parties. In an exemplary embodiment, the digital token includes computer executable instructions that change the string of bytes from one state to another upon a condition in the instructions being fulfilled as the tokenized digital media file persists (is distributed or transferred) through a blockchain or distributed ledger network. A distributed ledger protocol used herein may be for example a blockchain protocol such as Ethereum or other DLT. The distributed ledger protocol may incorporate the use of smart contracts (computer code modules executed on a blockchain or DLT). The computer code modules are evolving files whose status changes as conditions/rules are fulfilled during the existence of the digital media file within the system. A token may be used to facilitate transfer between parties and when decoupled from the actual media file acts as a reference to the media file. This allows easy transfer of rights that is not dependent on how the actual media file is being transferred from person to person. As might be appreciated, a tokenized media file might never actually move from one location to the next. But the tokenized representation of the media file which might represent distribution rights can be transferred quickly and easily many times.

With reference to FIG. 2, a flow chart is shown representing an exemplary method 200 of implementing the present invention. As shown, a computer-implemented method 200 for managing digital media files in a computer network includes the following steps. At step 202, the method stores, in a memory of a processing server, a first digital media file, a set of derivative files and a logical association of the derivative files with the first digital media file. At step 204, the method generates, via a first computer code module, a first cryptographic token. At step 206, the method associates in the memory the first cryptographic token with the first digital media file. At step 208, the method associates the first cryptographic token with a first wallet address corresponding to a first wallet. At step 210, the method generates, via a second computer code module, a serialized set of non-fungible tokens and associating individual ones of the non-fungible tokens with individual ones of the derivative files. At step 212, the method associates individual ones of the non-fungible tokens with individual wallet addresses of a second set of wallets. At step 214, the first computer code module is configured to limit the initial transferability of the first cryptographic token from the first wallet to one of the second set of wallets.

The method 200 of FIG. 2 may further be characterized in one or more of the following manners: the first digital media file comprises a digital art file, a digital music file, a digital book or a digital collectibles file; the first digital media file is an original file and the set of derivative files comprise derivatives of the original file; the first digital media file is an original an original version of a creative work; and/or the first digital media file is an original file and the derivative files comprise a limited edition set of copies, modifications or enhancements of the original file.

Figure 3:
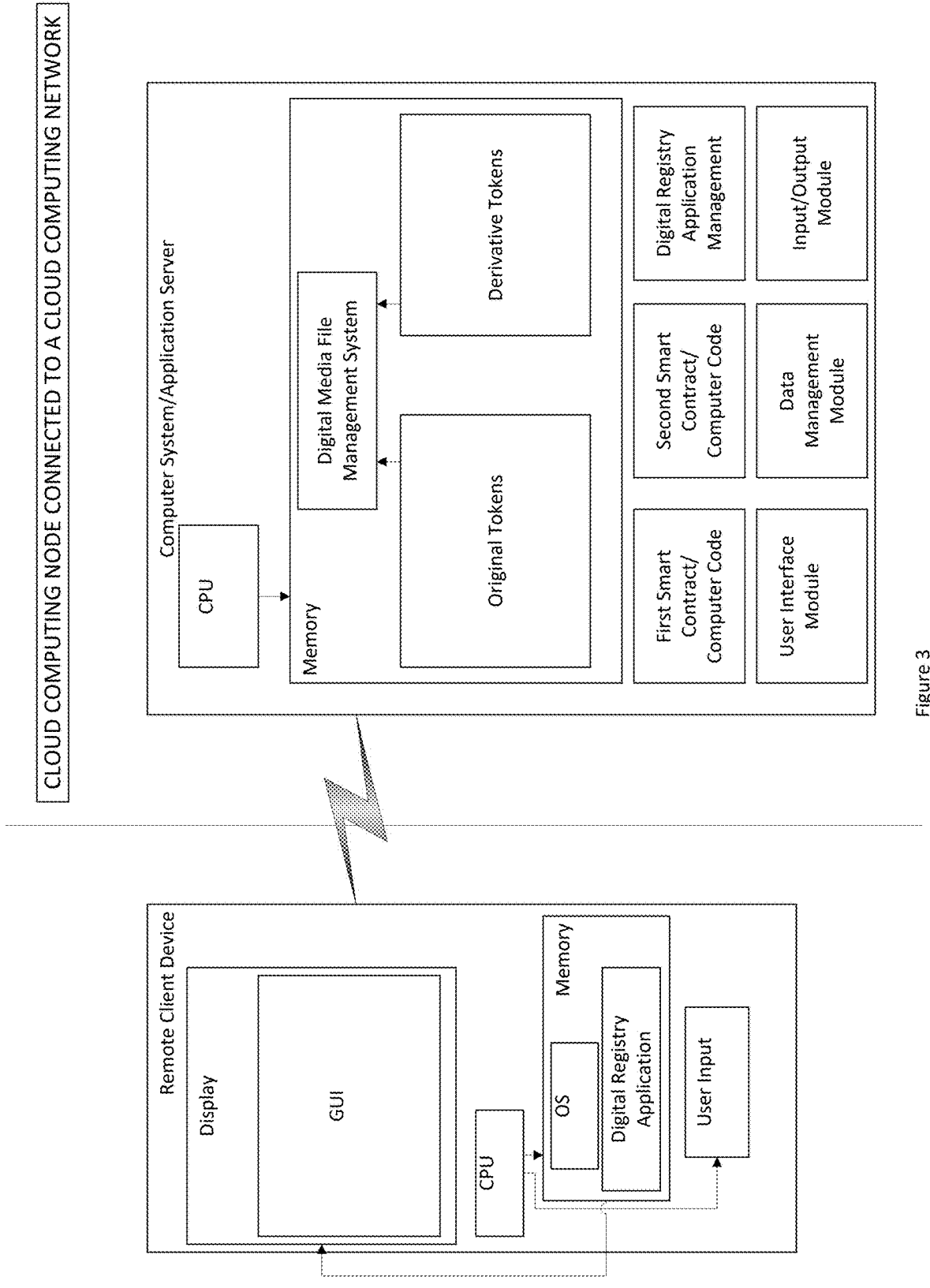
FIG. 3 provides a schematic diagram of an exemplary client/server architecture use in connection with the present invention.

FIG. 3 depicts an exemplary client/server architecture adapted for use in connection with the digital file management system of the present invention. A computer system/server may be for example, personal computer systems, tablet devices, mobile telephone devices, server computer systems, handheld or laptop devices, multiprocessor systems, microprocessor-based systems, set top boxes, programmable consumer electronics, network PCs, and distributed cloud computing environments that include any of the above systems or devices, and the like. The computer system/server may be described in the general context of computer system executable instructions, such as program modules, being executed by a computer system (described for example, below). In some embodiments, a computer system/server may be a cloud computing node connected to a cloud computing network. The computer system/server may be practiced in distributed cloud computing environments where tasks are performed by remote processing devices that are linked through a communications network. In a distributed cloud-computing environment, program modules may be located in both local and remote computer system storage media including memory storage devices.

The computer system/server may typically include a variety of computer system readable media. Such media could be chosen from any available media that is accessible by the computer system/server, including non-transitory, volatile and non-volatile media, removable and non-removable media. The system memory could include one or more computer system readable media in the form of volatile memory, such as a random access memory (RAM) and/or a cache memory. By way of example only, a storage system can be provided for reading from and writing to a non-removable, non-volatile magnetic media device typically called a "hard drive" (not shown). The system memory may include at least one program product having a set (e.g., at least one) of program modules that are configured to carry out the functions of embodiments of the invention. The program product/utility, having a set (at least one) of program modules, may be stored in the system memory by way of example, and not limitation, as well as an operating system, one or more application programs, other program modules, and program data. Each of the operating system, one or more application programs, other program modules, and program data or some combination thereof, may include an implementation of a networking environment. The program modules generally carry out the functions and/or methodologies of embodiments of the invention as described herein.

The computer system/server may also communicate with one or more external devices such as a keyboard, a pointing device, a display, etc.; and/or any devices (e.g., network card, modem, etc.) that enable the computer system/server to communicate with one or more other computing devices. Such communication can occur via Input/Output (I/O) interfaces. Alternatively, the computer system/server can communicate with one or more networks such as a local area network (LAN), a general wide area network (WAN), and/or a public network (e.g., the Internet) via a network adapter. The network adapter may communicate with the other components of the computer system/server via the bus.

As will be appreciated by one skilled in the art, aspects of the disclosed invention may be embodied as a system, method or process, or computer program product. Accordingly, aspects of the disclosed invention may take the form of an entirely hardware embodiment, or an embodiment combining software and hardware aspects that may all generally be referred to herein as a "circuit," "module," or "system." Furthermore, aspects of the disclosed invention may take the form of a computer program product embodied in one or more computer readable media having computer readable program code embodied thereon.

Any combination of one or more computer readable media (for example, storage system) may be utilized. In the context of this disclosure, a computer readable storage medium may be any tangible or non-transitory medium that can contain, or store a program (for example, the program product) for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing.

Aspects of the disclosed invention may be described herein with reference to block diagrams of methods, apparatus (systems) and computer program products according to embodiments of the invention. It will be understood that each block of the block diagrams, and combinations of blocks in the flowchart illustrations and/or block diagrams, can be implemented by computer program instructions. These computer program instructions may be provided to the processor of a computer, a special purpose computer, or other programmable data processing apparatus to produce a machine, such that the instructions, which execute via the processor of the computer or other programmable data processing apparatus, create structure for implementing the functions/acts specified in the flowchart and/or block diagram block or blocks.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects.

Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

Moreover, while the invention has been described by reference to certain preferred embodiments, it should be understood that numerous changes could be made within the spirit and scope of the inventive concept described. Also, the present invention is not to be limited in scope by the specific embodiments described herein. It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

What is claimed is:

1. A computer-implemented method for managing digital media files in a computer network comprising:

storing, in a memory of a processing server, a first digital media file, a set of derivative files and a logical association of the derivative files with the first digital media file;

generating, via a first computer code module, a first cryptographic token;

associating in the memory the first cryptographic token with the first digital media file;

associating the first cryptographic token with a first wallet address corresponding to a first wallet;

generating, via a second computer code module, a serialized set of non-fungible tokens and associating individual ones of the non-fungible tokens with individual ones of the derivative files; and associating individual ones of the non-fungible tokens with individual wallet addresses of a second set of wallets;

wherein the first computer code module is configured to limit the initial transferability of the first cryptographic token from the first wallet to one of the second set of wallets; and wherein the first digital media file is an original file and the derivative files comprise a limited edition set of copies, modifications or enhancements of the original file.

2. The method of claim 1 wherein the first digital media file comprises a digital art file, a digital music file, a digital book or a digital collectibles file.

3. The method of claim 1 wherein the first digital media file is an original file and the set of derivative files comprise derivatives of the original file.

4. The method of claim 1 wherein the first digital media file is an original version of a creative work.

5. The method of claim 1 further comprising the step of initiating an offer to transfer the first token by communicating an electronic message to the owners of the second set of wallets.

6. The method of claim 1 wherein a first sale or other transfer of the first cryptographic token comprises communicating an electronic message to the owners of the second set of wallets to notify them of an intent to transfer the first cryptographic token, permitting offer messages only from second set of wallet addresses and transferring the first cryptographic token to the one of the second set of wallets associated with an accepted offer.

7. The method of claim 6 wherein any subsequent transfer of the first cryptographic token from the one of the second set of wallets associated with the accepted offer is not limited to transfer to the one of the second set of wallets.

8. The method of claim 1 wherein the first computer code module comprises a first smart contract configured to limit transferability of the first token to an owner of the derivative files.

9. The method of claim 1 wherein the second computer code module is configured to manage aspects of a transfer of the NFTs and rights of the corresponding NFT owner to acquire the first token associated with the original file.

10. The method of claim 1 wherein the NFTs representing ownership of the derivative files are configured to give the corresponding NFT owners an exclusive right to participate in an offering to acquire ownership of the original file.

11. The method of claim 1 wherein the step of associating the first cryptographic token with a corresponding first wallet includes associating the first cryptographic token with the first wallet via a blockchain or other decentralized registry.

12. A computer-implemented method for managing digital media files in a computer network comprising:

storing, in a memory of a processing server, a first digital media file, a set of derivative files and a logical association of the derivative files with the first digital media file;

generating, via a first computer code module, a first cryptographic token;

associating in the memory the first cryptographic token with the first digital media file;

associating the first cryptographic token with a first wallet address corresponding to a first wallet;

generating, via a second computer code module, a serialized set of non-fungible tokens and associating individual ones of the non-fungible tokens with individual ones of the derivative files; and associating individual ones of the non-fungible tokens with individual wallet addresses of a second set of wallets;

wherein the first computer code module is configured to limit the initial transferability of the first cryptographic token from the first wallet to one of the second set of wallets; and wherein the first digital media file is an original file and the set of derivative files comprise derivatives of the original file.

13. The method of claim 12 wherein the first digital media file comprises a digital art file, a digital music file, a digital book or a digital collectibles file.

14. The method of claim 12 wherein the first digital media file is an original file and the derivative files comprise a limited edition set of copies, modifications or enhancements of the original file.

15. The method of claim 12 wherein the first digital media file is an original version of a creative work.

16. The method of claim 12 further comprising the step of initiating an offer to transfer the first token by communicating an electronic message to the owners of the second set of wallets.

17. The method of claim 12 wherein a first sale or other transfer of the first cryptographic token comprises communicating an electronic message to the owners of the second set of wallets to notify them of an intent to transfer the first cryptographic token, permitting offer messages only from second set of wallet addresses and transferring the first cryptographic token to the one of the second set of wallets associated with an accepted offer.

18. The method of claim 17 wherein any subsequent transfer of the first cryptographic token from the one of the second set of wallets associated with the accepted offer is not limited to transfer to the one of the second set of wallets.

19. The method of claim 12 wherein the first computer code module comprises a first smart contract configured to limit transferability of the first token to an owner of the derivative files.

20. The method of claim 12 wherein the second computer code module is configured to manage aspects of a transfer of the NFTs and rights of the corresponding NFT owner to acquire the first token associated with the original file.

21. The method of claim 12 wherein the NFTs representing ownership of the derivative files are configured to give the corresponding NFT owners an exclusive right to participate in an offering to acquire ownership of the original file.

22. The method of claim 12 wherein the step of associating the first cryptographic token with a corresponding first wallet includes associating the first cryptographic token with the first wallet via a blockchain or other decentralized registry.

* * * * *